(12) United States Patent
Choi

(10) Patent No.: US 11,949,643 B2
(45) Date of Patent: Apr. 2, 2024

(54) APPARATUS AND METHOD FOR DISPLAYING ANNOUNCEMENTS FROM INSTANT MESSAGING SERVICES

(71) Applicant: SAMSUNG SDS CO., LTD., Seoul (KR)

(72) Inventor: Ji Seon Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/828,459

(22) Filed: May 31, 2022

(65) Prior Publication Data

US 2022/0385614 A1 Dec. 1, 2022

(30) Foreign Application Priority Data

May 31, 2021 (KR) .................. 10-2021-0069858

(51) Int. Cl.
*H04L 51/224* (2022.01)
*H04L 51/04* (2022.01)
*H04L 51/226* (2022.01)

(52) U.S. Cl.
CPC ............ *H04L 51/224* (2022.05); *H04L 51/04* (2013.01); *H04L 51/226* (2022.05)

(58) Field of Classification Search
None
See application file for complete search history.

(56) References Cited

U.S. PATENT DOCUMENTS

| | | | | |
|---|---|---|---|---|
| 10,848,445 | B1* | 11/2020 | Willmann | H04L 51/046 |
| 2006/0026256 | A1* | 2/2006 | Diddee | H04L 51/04 |
| | | | | 709/207 |
| 2014/0344721 | A1* | 11/2014 | Prakash | H04M 1/27453 |
| | | | | 715/753 |
| 2016/0094536 | A1 | 3/2016 | Krueger | |
| 2016/0147387 | A1* | 5/2016 | Rahman | G06F 40/258 |
| | | | | 715/752 |
| 2016/0330313 | A1* | 11/2016 | Li | G06F 3/04845 |
| 2017/0075737 | A1* | 3/2017 | Kim | G06F 3/0488 |
| 2017/0329287 | A1* | 11/2017 | Kurisu | G04G 13/021 |
| 2018/0210566 | A1* | 7/2018 | Verma | G06F 3/03545 |
| 2018/0315294 | A1* | 11/2018 | Takano | G08B 25/001 |
| 2020/0084185 | A1* | 3/2020 | Okano | G06F 16/9014 |
| 2021/0126882 | A1* | 4/2021 | Everton | H04L 51/046 |
| 2021/0243142 | A1* | 8/2021 | Treat | H04L 51/212 |
| 2021/0344633 | A1* | 11/2021 | Bar-on | H04L 51/42 |
| 2022/0030037 | A1* | 1/2022 | Liu | H04M 1/72436 |
| 2023/0126687 | A1* | 4/2023 | Thrower, III | H04L 51/08 |
| | | | | 709/206 |

FOREIGN PATENT DOCUMENTS

| | | |
|---|---|---|
| KR | 10-1335125 B1 | 12/2013 |
| KR | 10-1397080 B1 | 5/2014 |
| KR | 10-1640463 B1 | 7/2016 |
| KR | 10-2017-0053996 A | 5/2017 |

\* cited by examiner

*Primary Examiner* — Chris Parry
*Assistant Examiner* — Abderrahmen Chouat
(74) *Attorney, Agent, or Firm* — Sughrue Mion, PLLC

(57) ABSTRACT

An announcement display method according to an embodiment of the present disclosure is performed by a computing device, and includes displaying an intro screen including a friend account list of a user account, and fixedly displaying an announcement list at the top of the intro screen, wherein the announcement list comprises an announcement of at least one chat room to which the user account belongs.

17 Claims, 19 Drawing Sheets

APPARATUS AND METHOD FOR DISPLAYING ANNOUNCEMENTS FROM INSTANT MESSAGING SERVICES

CROSS-REFERENCE TO RELATED APPLICATION AND CLAIM OF PRIORITY

This application claims the benefit under 35 USC § 119 of Korean Patent Application No. 10-2021-0069858 filed on May 31, 2021, in the Korean Intellectual Property Office, the entire disclosure of which is incorporated herein by reference for all purposes.

BACKGROUND

1. Field of the Disclosure

The present disclosure relates to an apparatus and method for displaying announcements from instant messaging services, and more particularly, to an apparatus and method for displaying announcements from instant messaging services in order to easily check announcements of a plurality of chat rooms to which a user account belongs, even when a user does not enter the chat rooms.

2. Description of the Related Art

Instant messaging services have become an essential element in the lives of modern people and are also being used as important tools in business environments. In particular, the announcement function of instant messaging services is used as a way to share urgent information among users who use the instant messaging services.

However, in conventional instant messaging services, users can check announcements between accounts participating in a chat room to which their user accounts belong only by entering the chat room. In general, a user account participates in multiple chat rooms, and in order to check announcements shared in a specific chat room, a user should find the specific chat room among the multiple chat rooms and enter the chat room to check the announcements.

Accordingly, a technology for easily checking announcements of a plurality of chat rooms to which a user account belongs is required.

SUMMARY

A technical aspect to be achieved through some embodiments of the present disclosure is to provide a device that can easily check an announcement and a method performed by the same device.

Another technical aspect to be achieved through some embodiments of the present disclosure is to provide a device that can check an announcement of a plurality of chat rooms to which a user account belongs even when a user does not enter the chat rooms and a method performed by the device.

Another technical aspect to be achieved through some embodiments of the present disclosure is to provide a device that can sort a plurality of announcements according to the importance of each of the announcements and a method performed by the device.

Another technical aspect to be achieved through some embodiments of the present disclosure is to provide a device that can intuitively check an announcement of a chat room displayed on a chat screen and a method performed by the device.

The technical aspects of the present disclosure are not limited to those described above, and other aspects that are not described herein will be apparently understood by those skilled in the art from the following description.

According to an aspect of the inventive concept, there is provided an announcement display method performed by a computing device for an instant messaging service. The announcement display method includes operations of displaying an intro screen including a friend account list of a user account, and fixedly displaying an announcement list at the top of the intro screen, wherein the announcement list includes an announcement of at least one chat room to which the user account belongs.

The announcement display method may further include an operation of displaying a comment creation window in response to a comment creation trigger for a first announcement included in the announcement list, the comment creation trigger being a user manipulation performed on the intro screen, wherein the operation of displaying the announcement list includes an operation of displaying a comment input to the comment creation window in association with the first announcement.

The operation of displaying the comment input to the comment creation window in association with the first announcement may include operations of determining, as a visibility range, at least some of participant accounts of a chat room corresponding to the first announcement and displaying the comment in association with the first announcement included in an announcement list of the participant accounts corresponding to the visibility range.

The operation of displaying the announcement list may further include an operation of deleting at least one announcement included in the announcement list in response to an announcement deletion trigger.

The operation of displaying the announcement list may include an operation of sorting and displaying a plurality of announcements included in the announcement list in order of importance.

The importance may be determined based on a score assigned by a creator account of each of the plurality of announcements.

The importance may be determined based on a result of searching each of the plurality of announcements for a predetermined keyword.

The operation of displaying the announcement list may include an operation of sorting and displaying a plurality of announcements included in the announcement list in an order corresponding to a rule designated by a user in response to a sort trigger.

The announcement display method may further include an operation of providing an alarm for at least one announcement included in the announcement list at a time specified by a user in response to an announcement notification trigger.

The announcement display method may further include an operation of transmitting at least one announcement included in the announcement list to a mail address associated with the user account in response to a mail transmission trigger.

The announcement display method may further include an operation of displaying a detailed view pop-up window for at least one announcement included in the announcement list in response to a detailed view trigger.

The announcement display method may further include an operation of displaying a chat room corresponding to at least one announcement included in the announcement list in response to a chat room connection trigger.

According to an aspect of the inventive concept, there is provided an announcement display method performed by a computing device for an instant messaging service. The announcement display method includes operations of displaying an announcement creation window in response to an announcement creation trigger, the announcement creation trigger being a user manipulation performed in a first intro screen of a user account, determining a visibility range of an announcement input to the announcement creation window, and displaying the announcement in an announcement list of an account corresponding to the visibility range, wherein the announcement list is fixedly displayed at the top of a second intro screen of an account corresponding to the visibility range.

The operation of determining the visibility range may include an operation of determining the visibility range in response to a drag input for at least one friend account included in a friend account list of the first intro screen.

The operation of determining the visibility range may include an operation of determining the visibility range in response to a drag input for a group included in a friend account list of the first intro screen.

The operation of determining the visibility range may include operations of displaying a visibility range configuration window in response to a visibility range configuration trigger and determining the visibility range on the basis of a friend account input to the visibility range configuration window.

The operation of displaying the announcement in the announcement list of the account corresponding to the visibility range may include an operation of displaying the announcement during only a period specified by the user.

According to an aspect of the inventive concept, there is provided an announcement display method performed by a computing device for an instant messaging service. The announcement display method includes operations of displaying a chat screen including at least one chat room to which a user account belongs, and fixedly displaying an announcement list at the top of the chat screen, wherein the announcement list includes an announcement of at least one chat room to which the user account belongs.

The operation of displaying the chat screen may include an operation of displaying an announcement icon in a chat room corresponding to an announcement included in the announcement list.

The operation of displaying the chat screen may include an operation of changing and displaying a chat room included in the chat screen in response to a chat room search trigger, and the operation of displaying the announcement list includes an operation of displaying only an announcement corresponding to the displayed chat room in response to the chat room search trigger.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

Figure 1:
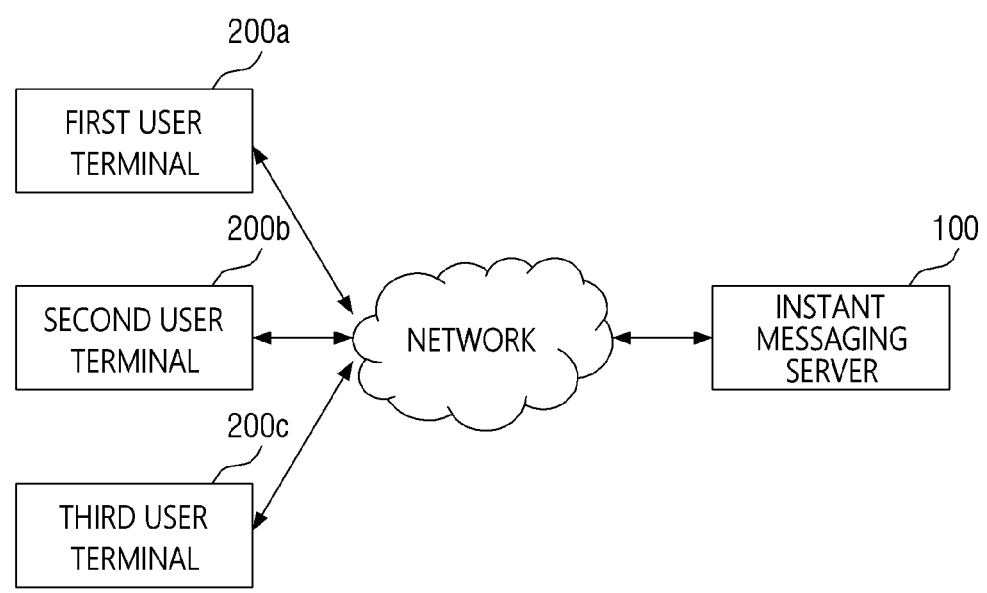
FIG. 1 shows an exemplary environment to which an announcement display device according to some embodiments of the present disclosure can be applied.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

As used herein, a "trigger" is an event that causes a visual change on a user interface and/or any reaction or feedback of a device in which a user interface is implemented. Triggers may include user inputs on the user interface, other external inputs through sensors, or other events occurring on the user interface. A trigger may be a touch input or gesture on a touch screen provided in a device to which the user interface is applied, a user input through a device such as a mouse or keyboard, or an event generated by data measured by a sensor (e.g., a camera, a microphone, an acceleration sensor, a gyro sensor, etc.) which is provided in the device or a sensor (e.g., an illuminance sensor, a temperature sensor, a human body sensor, etc.) which provides data from the outside to the device.

As used herein, "response" refers to a response caused by a trigger. As an example, a response may be a change in display attributes (position, size, transparency, color, azimuth, etc.) of an object of the user interface. In this case, the output of the response may be the execution of an operation for changing a display attribute of the object. As another example, the response may be haptic feedback or sound feedback of a device in which the user interface is implemented. Meanwhile, the response may act as a trigger for causing other responses.

Meanwhile, a trigger may be defined as causing different responses depending on the occurrence conditions of the trigger.

Hereinafter, various embodiments of the present disclosure will be described in detail with reference to the accompanying drawings.

FIG. 1 shows an exemplary environment to which an announcement display device according to some embodiments of the present disclosure can be applied. For example, the announcement display device may be implemented by being included in an instant messaging server 100. As another example, the announcement display device may be implemented by being included in user terminals 200a, 200b, and 200c. In other words, the announcement display device may be implemented at the server end (e.g., the instant messaging server 100) and may be implemented at the terminal end (e.g., the user terminals 200a, 200b, and 200c).

FIG. 1 shows that the three user terminals 200a, 200b, and 200c are connected to a network. However, this is only for convenience of understanding, and the number of user terminals 200a, 200b, and 200c that can be connected to the network may vary.

Meanwhile, FIG. 1 shows a preferred embodiment for accomplishing the purpose of the present disclosure, and some components may be added or deleted as needed. Each component shown in FIG. 1 will be described in detail below.

The instant messaging server 100 may perform various operations for providing an instant messaging service to a user. For example, the instant messaging server 100 may be implemented such that instant messages are exchanged between a first user who uses the first user terminal 200a and a second user who uses the second user terminal 200b. Here, it should be noted that all known techniques for providing an instant messaging service to users may be applied to the present disclosure.

The instant messaging server 100 may provide announcements of chat rooms to which user accounts belongs to the user terminals 200a, 200b, and 200c. For example, the instant messaging server 100 may provide, to the first user terminal 200a, an announcement of a chat room to which a user account corresponding to the first user terminal 200a belongs. Here, the instant messaging server 100 may allow announcements to be fixedly displayed in a specific area of the screens of the user terminals 200a, 200b, and 200c. For example, an announcement may be fixedly displayed in a specific area of an intro screen displayed on the first user terminal 200a. As another example, an announcement may be fixedly displayed in a specific area of a chat screen displayed on the second user terminal 200b.

The instant messaging server 100 may be implemented to provide a response corresponding to a trigger of a user to the user terminals 200a, 200b, and 200c in response to the trigger. In addition, the instant messaging server 100 may perform various operations related to announcements, and the various operations will be specifically described in the specification.

The instant messaging server 100 may be implemented with one or more computing devices. For example, all the functions of the instant messaging server 100 may be implemented in a single computing device. As another example, a first function of the instant messaging server 100 may be implemented in a first computing device, and a second function may be implemented in a second computing device. Here, the computing device may be a notebook, a desktop, a laptop, etc. However, the present invention is not limited thereto, and the computing device may include any kind of computing-function-equipped device. However, in an environment in which the instant messaging server 100 should be connected to various user terminals 200a, 200b, and 200c to provide an instant messaging service, the instant messaging server 100 may be preferably implemented as a high-performance server-grade computing device. See FIG. 19 for an example of the computing device.

Subsequently, the user terminals 200a, 200b, and 200c may use an instant messaging service. For example, the first user terminal 200a may transmit a message input by the first user to the instant messaging server 100, and the instant messaging server 100 may transmit a message input by the first user to the second user terminal 200b that the second user uses. As another example, the first user terminal 200a may transmit the message input by the first user to the instant messaging server 100, and the instant messaging server 100 may transmit the message input by the first user to the second user terminal 200b that the second user uses and the third user terminal 200c that the third user uses. Here, in order to transmit a message to a specific user terminal, the friend registration of corresponding accounts may be required in advance, and a message may be allowed to be exchanged in a chat room in which at least three accounts participate. In addition, it will be understood that all known techniques related to the instant messaging service may be applied to the present disclosure.

The user terminals 200a, 200b, and 200c may display an announcement that the instant messaging server 100 provides. Here, the user terminals 200a, 200b, and 200c may fixedly display an announcement in specific areas of the screens.

The user terminals 200a, 200b, and 200c may sense a user's trigger. Various sensors for sensing a trigger may be included in the user terminals 200a, 200b, and 200c, and all known techniques for sensing a trigger may be applied to the present disclosure.

The user terminals 200a, 200b, and 200c may provide a response corresponding to the sensed trigger to the user. Here, the response may be based on information that the instant messaging server 100 provides. That is, the response corresponding to the trigger may be implemented at the terminal end (e.g., the user terminals 200a, 200b, and 200c) to be executed in the user terminals 200a, 200b, and 200c or may be implemented at the server end (e.g., the instant messaging server 100).

The user terminals 200a, 200b, and 200c may have a web browser or a dedicated application installed therein to use the instant messaging service. For example, the user terminals 200a, 200b, and 200c may be any one of a desktop, a workstation, a laptop, a tablet, and a smartphone. However, the present invention is not limited thereto, and the user terminals 200a, 200b, and 200c may include any kind of computing-function-equipped device. An example of the computing-function-equipped device may be understood with reference to FIG. 19.

In some embodiments, the instant messaging server 100 and the user terminals 200a, 200b, and 200c may communicate with each other over a network. The network may be implemented as any kind of wired or wireless network such as a local area network (LAN), a wide area network (WAN), a mobile radio communication network, and Wireless Broadband Internet (Wibro).

The exemplary environment to which the announcement display device according to some embodiments of the present disclosure may be applied has been described with reference to FIG. 1 so far. Various methods according to some embodiments of the present disclosure will be described below with reference to FIGS. 2 to 18.

Each operation of the methods may be performed by the computing device. In other words, each operation of the methods may be implemented with one or more instructions executed by a processor of the computing device.

All the operations included in the methods may be executed by one physical computing device. First operations of the methods may be performed by a first computing device, and second operations of the methods may be performed by a second computing device.

The following description assumes that each operation of the methods is performed by the announcement display device that has been described with reference to FIG. 1. In particular, the following description is based on the implementation of the announcement display device in the user terminals 200a, 200b, and 200c shown in FIG. 1. However, for convenience of description, the description of an entity of each operation included in the methods will be omitted. Corresponding operations performed by the instant messaging server 100 may be understood in the description based on the operations performed by the user terminals 200a, 200b, and 200c.

Figure 2:
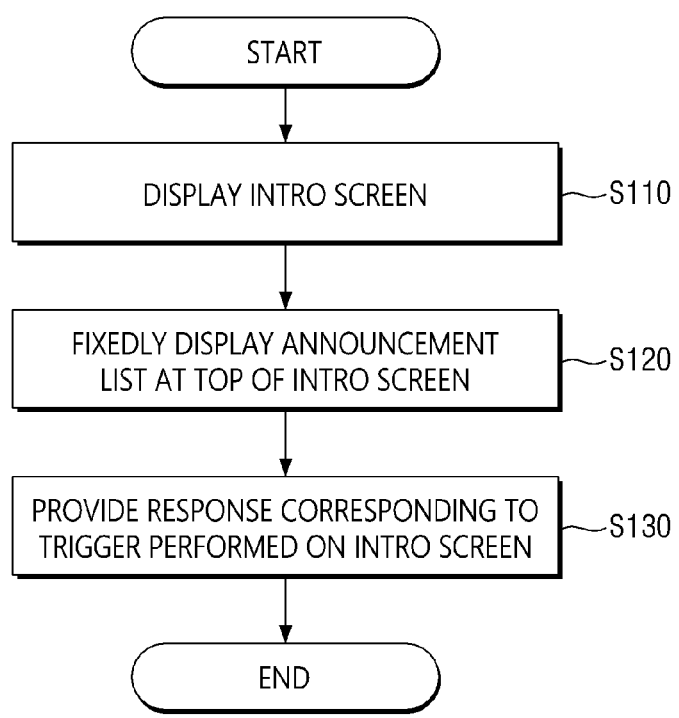
FIG. 2 is an exemplary flowchart illustrating an announcement display method according to some embodiments of the present disclosure.

FIG. 2 is an exemplary flowchart of operations performed on an intro screen of an instant messaging service. Here, the intro screen may be a screen for introducing an instant messaging service. For example, the intro screen may be a contacts screen in which a list of friend accounts of a user account is displayed.

Referring to FIG. 2, in operation S110, an intro screen may be displayed. This will be described in detail below with reference to FIG. 5.

Figure 5:
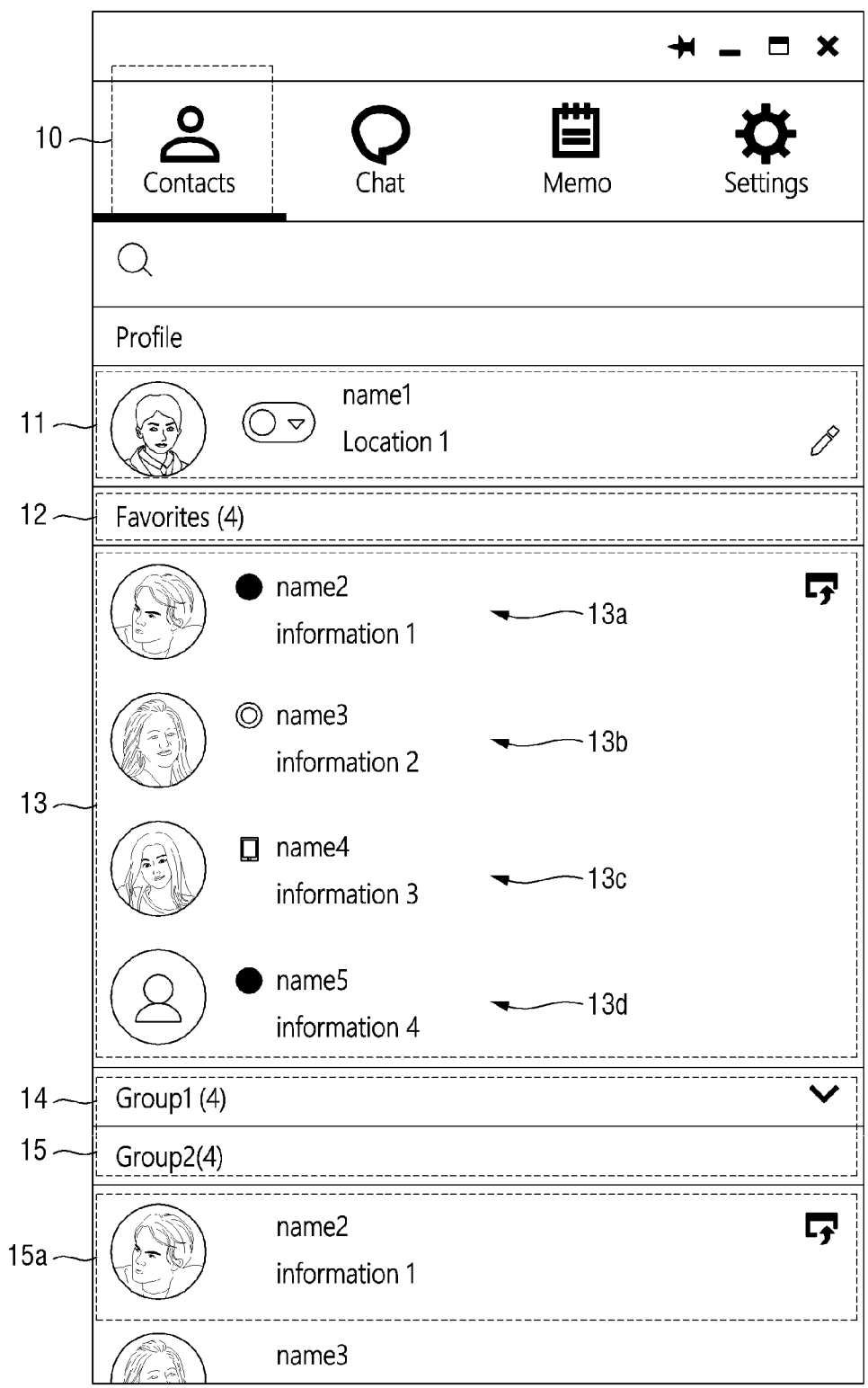
FIG. 5 is an example diagram of an intro screen of an instant messaging service, to be referenced in some embodiments of the present invention.

The instant messaging service may include various screens. Also, a plurality of buttons may be provided so as to change a screen that the instant messaging service provides, and FIG. 5 shows an example in which a contacts button 10 is touched by a user. Here, a screen displayed when the contacts button 10 is touched may be referred to as a contacts screen. Meanwhile, the contacts screen may be an intro screen that is set as a default and displayed when the instant messaging service is introduced without a separate button touch input.

Referring to FIG. 5, the contacts screen may include profile information 11 of the user account. Also, the contacts screen may include a plurality of friend accounts of the user account.

In some embodiments related to the contacts screen, favorites 12 set in advance by the user account may be displayed on the contacts screen. In other embodiments, groups 14 and 15 set for the user account in advance may be displayed on the contacts screen. FIG. 5 shows a plurality of friend accounts 13 of the user account included in the favorites 12 and also shows a friend account 15a belonging to group 2 15. In addition to those shown in FIG. 5, all known elements that may be included in the contacts screen may be applied to the present disclosure.

The following description refers back to FIG. 2.

Next, in operation S120, an announcement list may be fixedly displayed at the top of the intro screen. This will be described in detail below with reference to FIGS. 6 and 7.

Figure 6:
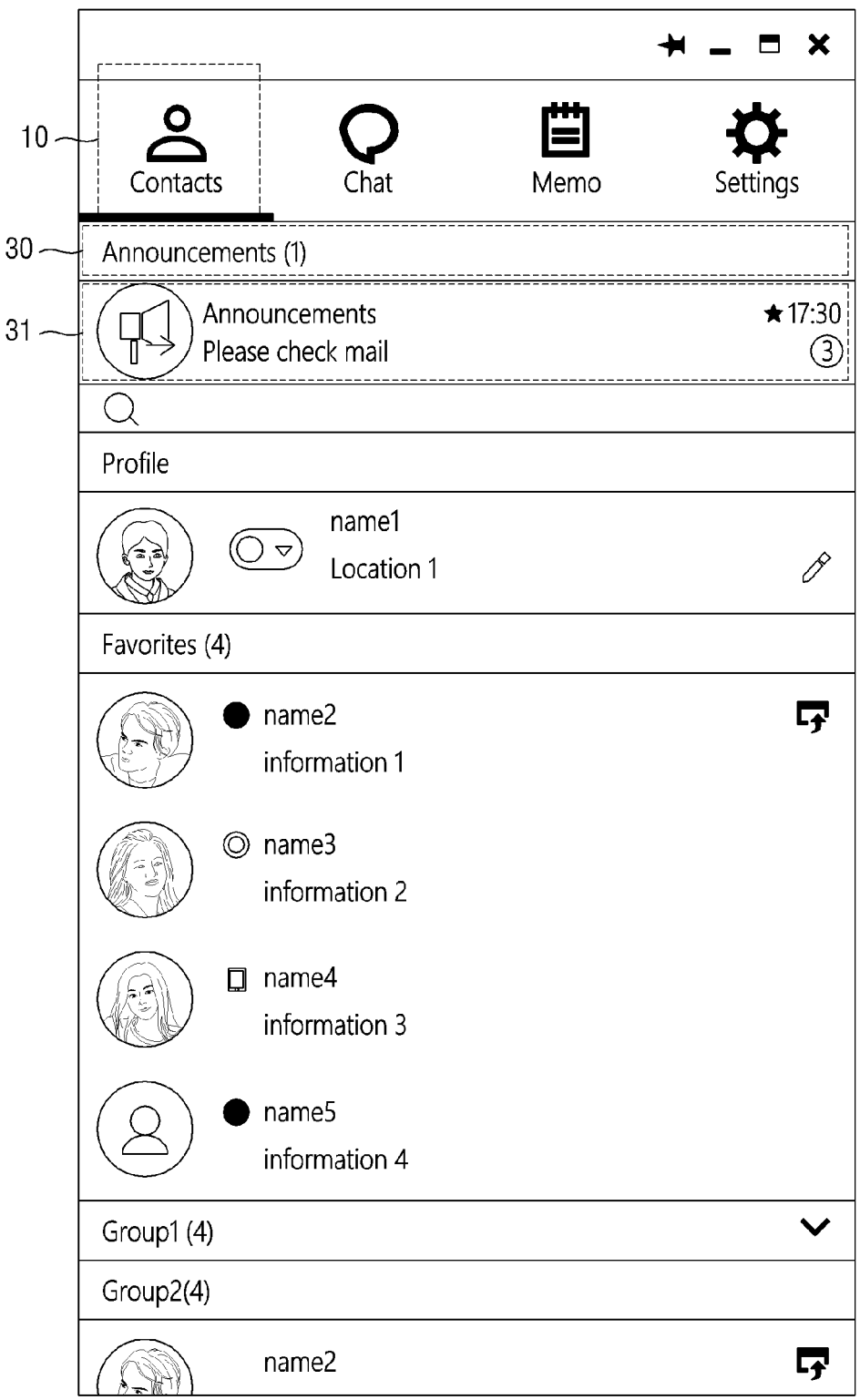
FIG. 6 is an example diagram of an intro screen in which an announcement list is displayed, to be referenced in some embodiments of the present disclosure.
Figure 7:
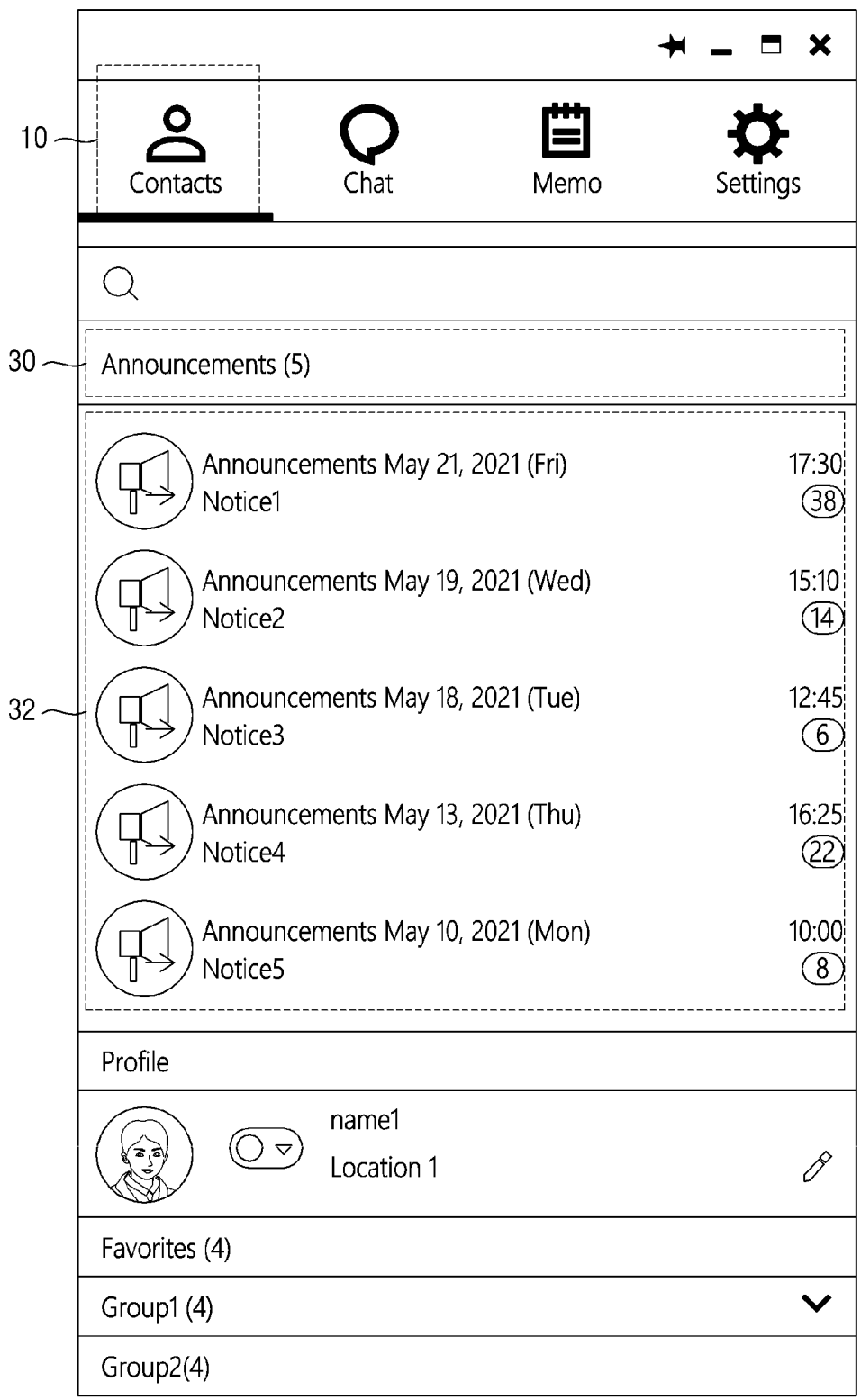
FIG. 7 is another example diagram of an intro screen in which the announcement list is displayed, described with reference to FIG. 6.

Referring to FIG. 6, it can be seen that an announcement list 30 fixed at the top of the intro screen (e.g., the contacts screen) is shown. Also, an announcement 31 included in the announcement list 30 may be checked. Here, the announcement may be an announcement of one of a plurality of chat rooms to which the user account belongs. Referring to FIG. 7, a plurality of announcements 32 included in the announcement list 30 may be checked. Here, the plurality of announcements may be announcements of at least some of a plurality of chat rooms to which the user account belongs. Usually, a user participates in multiple chat rooms. Thus, according to the conventional art, a user's effort to find a specific chat room corresponding to a specific announcement among the multiple chat rooms in which the user participates is required in order to check the specific announcement. On the other hand, according to the embodiment described with reference to FIGS. 6 and 7, the user can directly check the announcement on the intro screen without having to enter a chat room in which the announcement is registered. Thus, it is possible to enhance user convenience.

In some embodiments related to operation S120, an acknowledgment function for the displayed announcement may be performed. According to this embodiment, the user may determine by how many accounts the announcement has been confirmed among the accounts associated with the announcement.

In some embodiments related to operation S120, a comment on the announcement may be displayed in association with the announcement. This will be described in detail below with reference to FIGS. 10 and 11.

Figure 10:
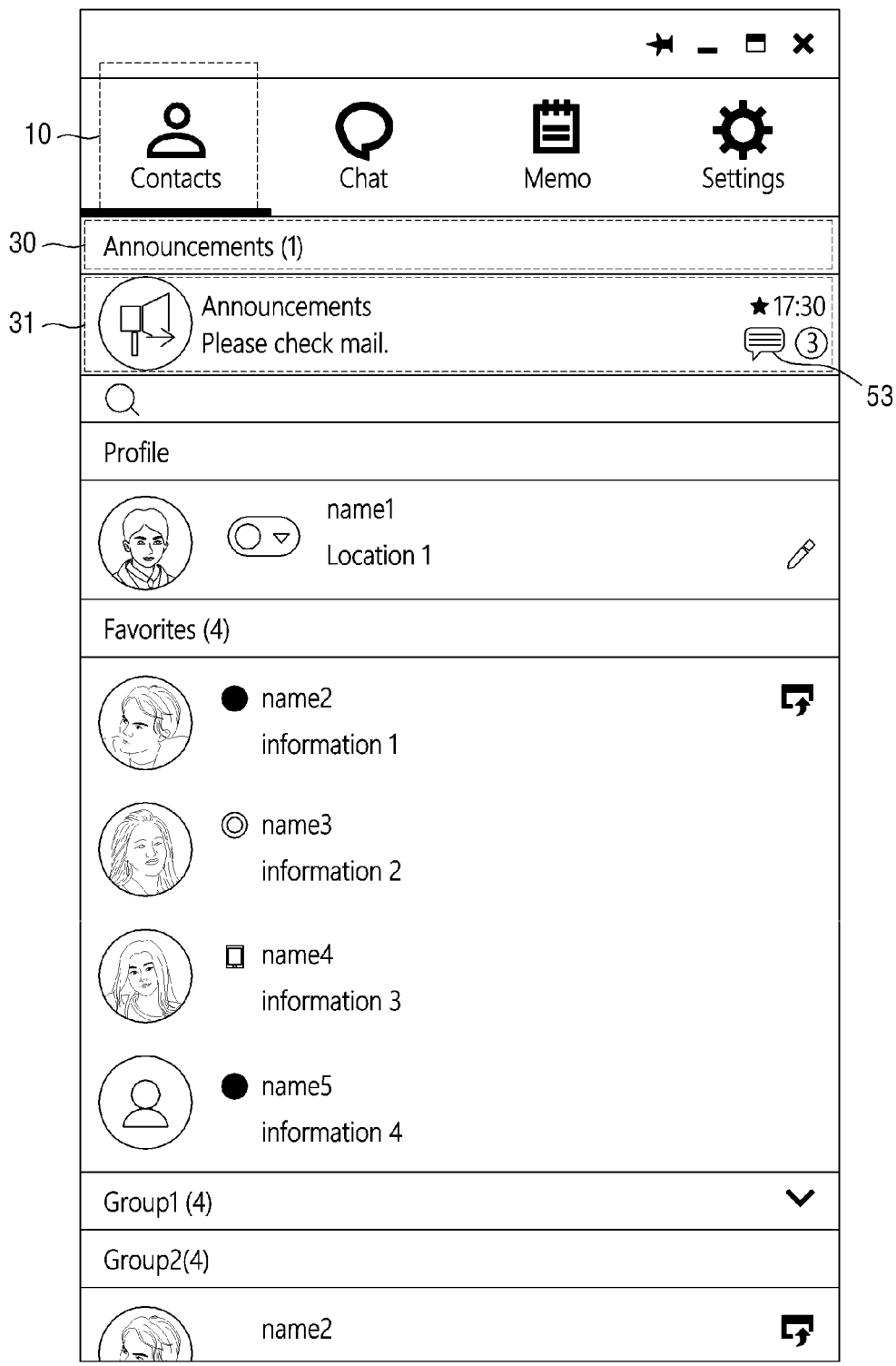
FIGS. 10 and 11 are example diagrams illustrating an operation of creating a comment to be referenced in some embodiments of the present disclosure.
Figure 11:
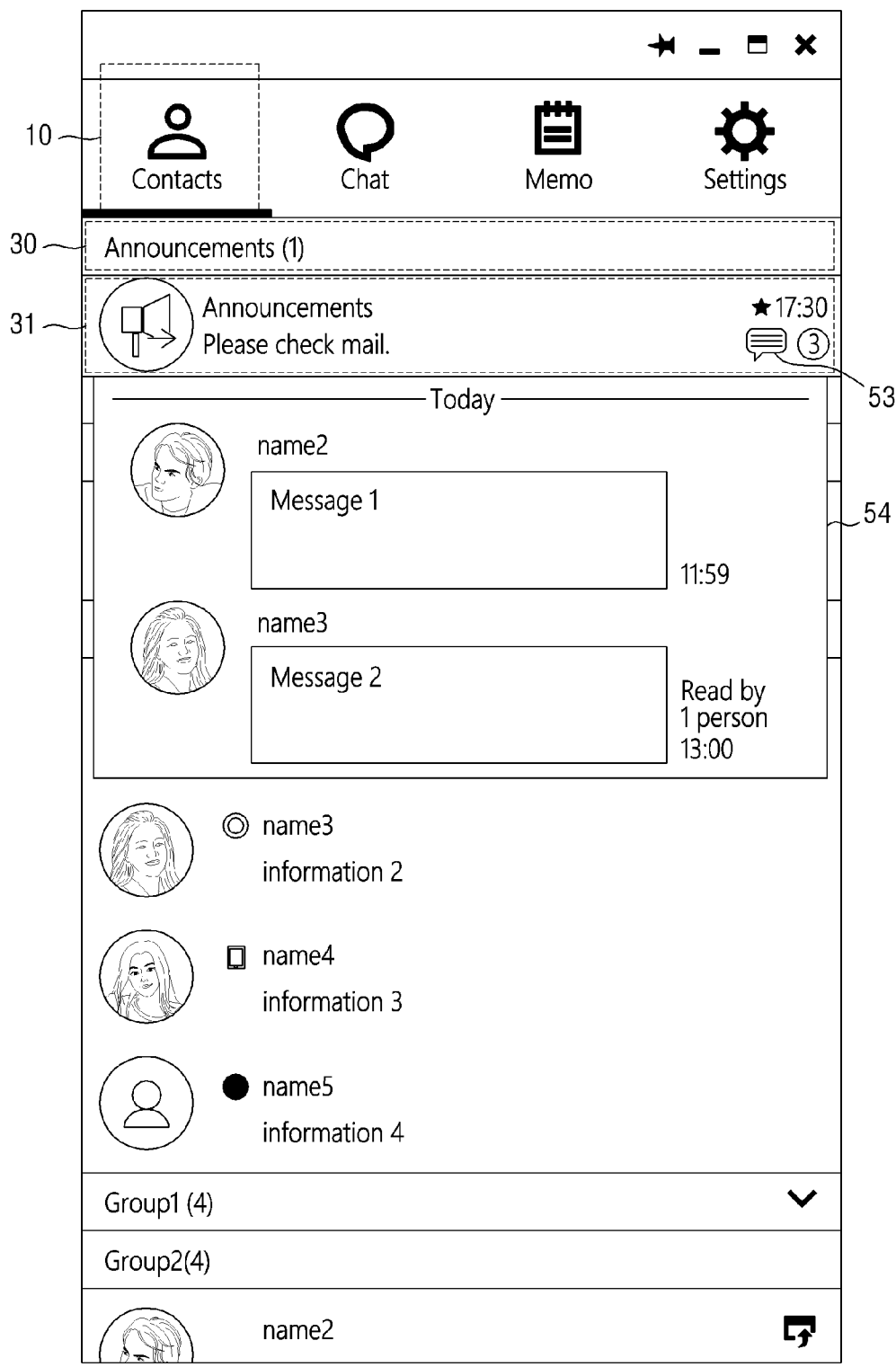

Referring to FIG. 10, it can be seen that a comment icon 53 is displayed in the announcement 31. For example, when the comment icon 53 is touched by the user, a comment related to the announcement 31 may be displayed in response to the touch. Referring to FIG. 11, it can be seen that a comment list 54 associated with the announcement 31 is displayed. According to an embodiment described with reference to FIGS. 10 and 11, Q&A and opinions on the announcement 31 may be shared with accounts associated with the announcement 31 through the comment list 54. FIGS. 10 and 11 show an example in which a user touches a comment icon 53 for displaying the comment list 54, but it should be noted that any user input may be included in the present disclosure as long as the user input is a predetermined user input for displaying the comment list 54.

In some embodiments related to the display of comments, an acknowledgment function for the displayed comment may be added. According to this embodiment, the user may determine by how many accounts the comment has been confirmed among the accounts associated with the announcement. It can be understood that a comment created by "Name 3" shown in FIG. 11 has been confirmed by one of the accounts associated with the announcement.

In some embodiments related to the creation of comments, a comment may be entered in a comment creation window displayed in response to a comment creation trigger. At this time, the comment creation trigger may be a long-press touch input for the announcement. However, the present invention is not limited thereto, and the comment creation trigger may include a touch input for a button provided in the comment list 54 shown in FIG. 11. It should be noted that any user input may be included in the present disclosure as long as the user input is a predetermined user input for displaying the comment creation window. Also, the comment creation trigger may be a user manipulation performed on the intro screen, and according to the present embodiment, the user can easily check announcements and comments related to the announcements on the intro screen without entering a chat room.

In some embodiments related to the visibility range of comments, at least some participator accounts of a chat room corresponding to an announcement may be determined as the visibility range, and a comment may be displayed in association with an announcement included in the announcement list of the participant account corresponding to the visibility range. Here, the determination of the visibility range may be designated by a comment creator account. For example, the visibility range may be designated by dragging some participants of a chat room corresponding to the announcement onto the comment creation window or directly inputting some participants into the comment creation window. Also, some of the participants of the chat room corresponding to the announcement may be determined according to the authority of an account set in advance. As a specific example related to this embodiment, when there are a first account, a second account, and a third account corresponding to the announcement, wherein the first account creates a comment, and the visibility range is determined to include the first account and the third account, the comment created by the first account may be displayed in the announcement included in the announcement list of the third account, and the comment created by the first account may not be displayed in the announcement included in the second account. According to this embodiment, comments may be displayed to at least some of the participants of the chat room corresponding to the announcement, and thus the free exchange of opinions on the announcement between the participants may be possible.

In other embodiments related to operation S120, at least one announcement included in the announcement list may be deleted in response to an announcement deletion trigger. The announcements displayed in the announcement list are announcements of the chat room to which the user account belongs, but the announcements may have different importance depending on the content of the announcements. Accordingly, a function of deleting at least one announcement included in the announcement list may be implemented according to this embodiment. Here, the announcement deletion trigger may be a long press touch input for the announcement, a deletion button input provided in the announcement, or a swipe input for the announcement. However, it should be noted that the scope of the present disclosure is not limited to the above-described examples and any user input may be included in the present disclosure as long as the user input is a predetermined user input for deleting an announcement.

Figure 14:
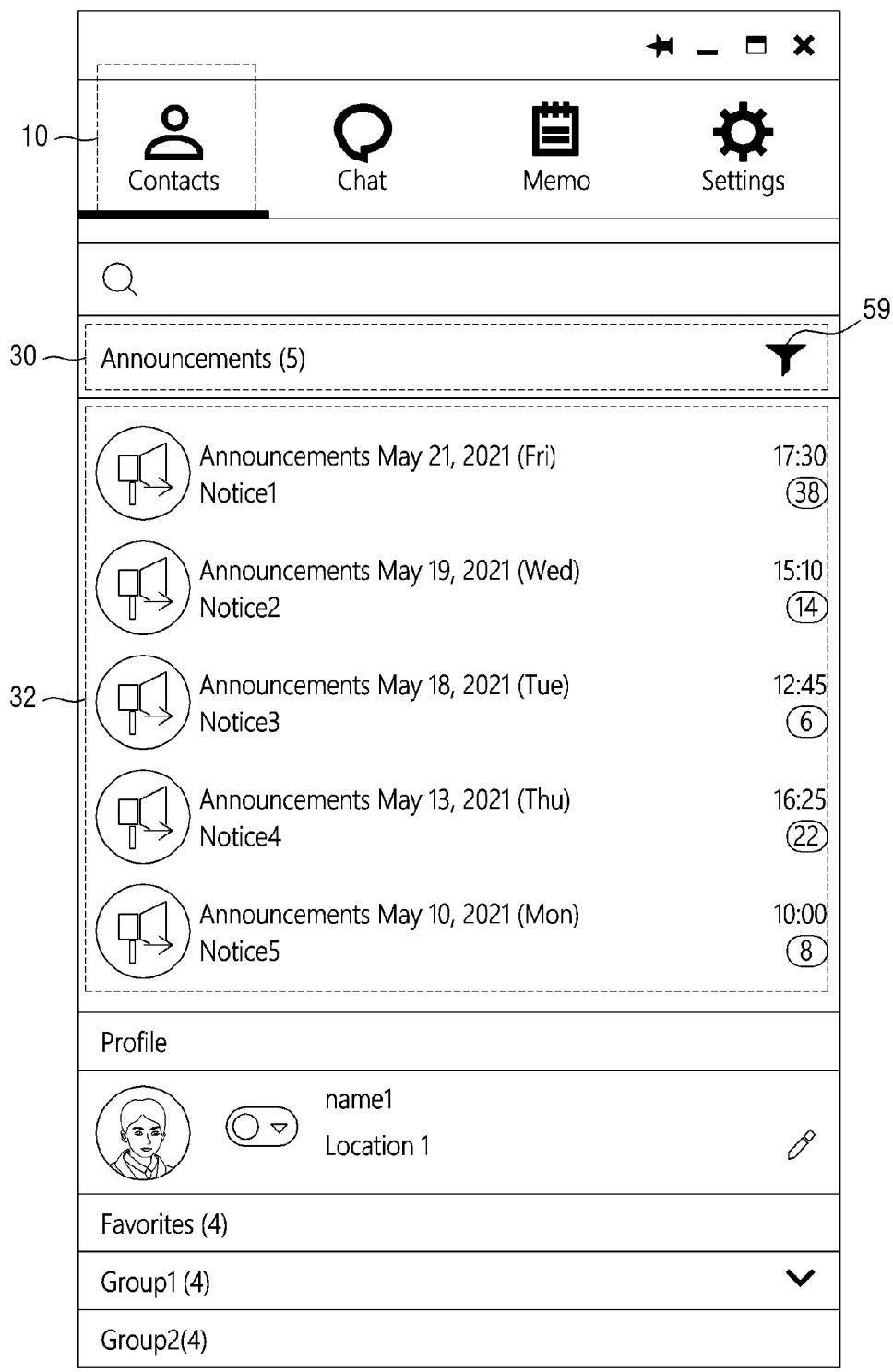
FIG. 14 is an example diagram illustrating an operation of aligning an announcement, to be referenced in some embodiments of the present disclosure.
Figure 15:
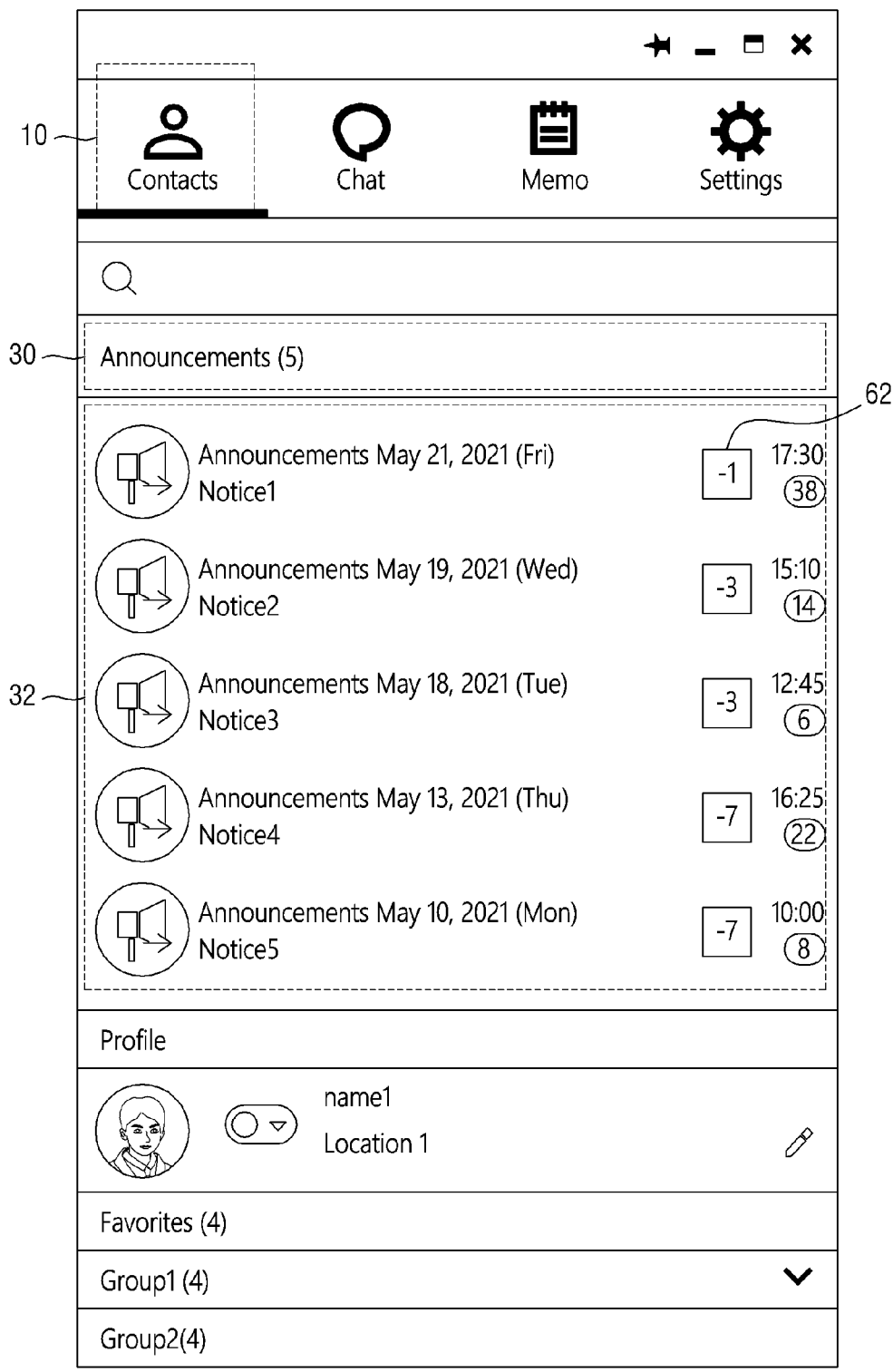
FIG. 15 is an example diagram illustrating a D-day display operation, to be referenced in some embodiments.

In other embodiments related to operation S120, a plurality of announcements included in the announcement list may be sorted and displayed in order of importance. The announcements may be sorted by default by a predetermined rule (e.g., importance), and the announcements may be sorted in an order corresponding to the rule in response to a sort trigger. According to this embodiment, it is possible to further enhance user convenience by sorting the announcements in order of the importance of the announcements. Referring to FIG. 14, it can be understood that when a user touches a sort icon 59 in the announcement list 30, the plurality of announcements 32 may be sorted according to a predetermined rule. However, it should be noted that, in addition to the touch input for the sort icon 59 shown in FIG. 14, any user input may be included as a sort trigger of the present disclosure as long as the user input is a predetermined user input for sorting announcements.

In some embodiments related to importance, the importance may be determined to be higher as the date associated with the announcement is closer. For example, referring to FIG. 15, it can be seen that D-DAY 62 of the date associated with each of a plurality of announcements is displayed, and it can also be seen that the closer the date associated with the announcement is, the closer to the top of the announcement list 30 the date is displayed. As another example, the announcement may be displayed separately as one of today's to-do, tomorrow's to-do, this week's to-do, and next week's to-do.

In other embodiments related to importance, the importance may be determined based on a score given by a creator account of each of the plurality of announcements. For example, the creator account of the announcement may give an announcement a score in the range of 1 to 10 while creating the announcement, and the order of announcements displayed on a view account may be determined based on scores of a plurality of announcements. According to this embodiment, the announcements may be sequentially displayed in order of the importance assigned by the creator account of the announcement, and thus it is possible to further enhance user convenience.

In other embodiments related to importance, the importance may be determined based on a result of searching each of the plurality of announcements for a predetermined keyword. For example, "urgent" may be included as a predetermined keyword, and when "urgent" is described in an announcement, importance may be determined to be high according to a matching relationship. As another example, "urgent" and "deadline" may be included as predetermined keywords, and importance may be determined by counting the number of times "urgent" and "deadline" are described in an announcement. That is, a plurality of keywords may be predetermined, and the importance may be calculated according to a matching relationship of each of the plurality of keywords. According to this embodiment, by identifying the content of announcements and displaying an announcement containing a predetermined keyword at the top of the announcement list, an announcement containing important content may be more intuitively recognized by a user.

The following description refers back to FIG. 2.

Next, in operation S130, a response corresponding to the trigger performed on the intro screen may be provided. As described above, various triggers included in the present disclosure may need to be determined to correspond to different user inputs because the triggers may be defined to cause different responses according to trigger generation conditions. Also, it should be noted that at least some of the various triggers included in the present disclosure may be omitted or other triggers not included in the present disclosure may be added.

Figure 13:
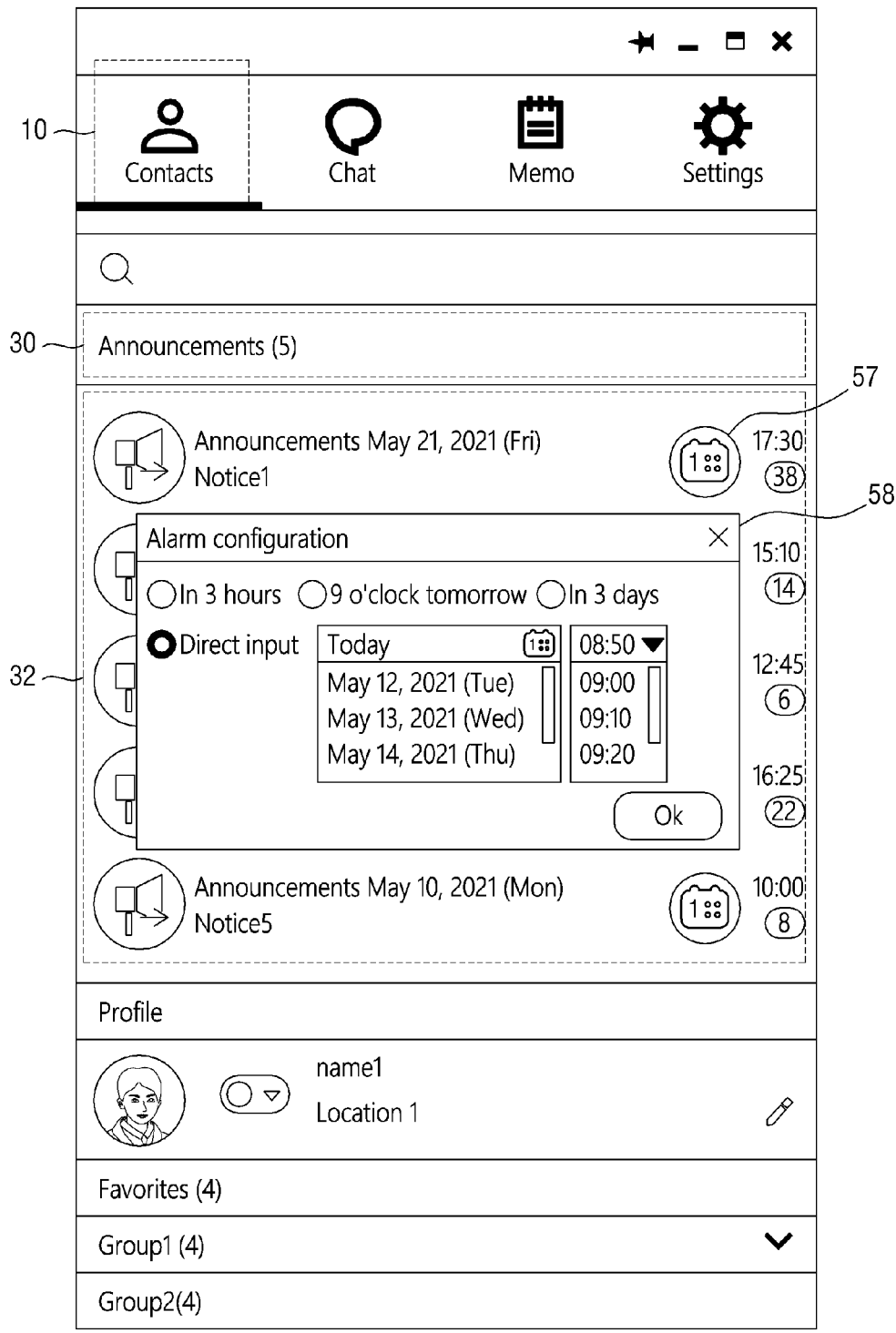
FIG. 13 is an example diagram illustrating an operation of making an announcement, to be referenced in some embodiments of the present disclosure.

In some embodiments related to operation S130, an alarm may be provided at a time specified by the user for at least one announcement included in the announcement list in response to an announcement notification trigger. According to this embodiment, it is possible to enhance user convenience by providing an alarm for the announcement specified by the user. For example, as shown in FIG. 13, when the user touches a notification icon 57, an alarm configuration pop-up window 58 may be displayed, and an alarm for an announcement for which the notification icon 57 is touched may be configured. The notification trigger according to the example shown in FIG. 13 is a user input of touching the notification icon 57, but various other user inputs may be included in the notification trigger. That is, any user input may be included as the notification trigger of the present disclosure as long as the user input is a user input that pops up a configuration window for configuring an alarm for an announcement.

In other embodiments related to operation S130, at least one announcement included in the announcement list may be transmitted to a mail address associated with the user account in response to a mail transmission trigger. According to this embodiment, it is possible to enhance user convenience by transmitting an announcement specified by the user via mail. For example, when a mail icon for the announcement is touched, a mail may be transmitted to a mail address associated with the user. However, the scope of the present disclosure is not limited thereto, and any user input may be included as the mail transmission trigger of the present disclosure as long as the user input is a user input for transmitting a mail for an announcement to a mail address associated with the user account.

Figure 12:
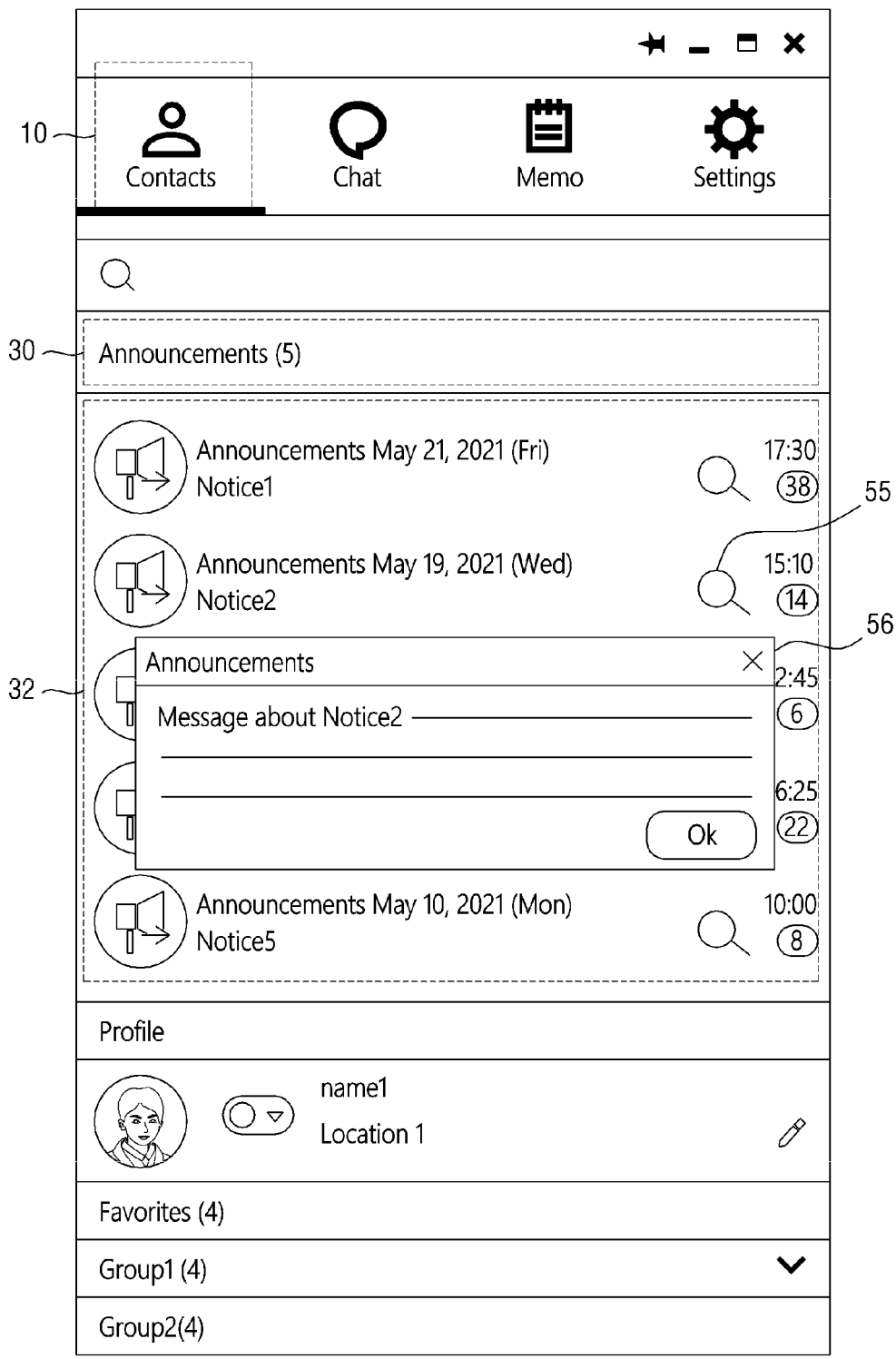
FIG. 12 is an example diagram illustrating an operation of viewing in detail an announcement, to be referenced in some embodiments of the present disclosure.

In other embodiments related to operation S130, a detailed view pop-up window for at least one announcement included in the announcement list may be displayed in response to a detailed view trigger. According to this embodiment, it is possible to enhance user convenience by providing a detailed view for the announcement specified by the user. For example, as shown in FIG. 12, when a user touches a detailed view icon 55, an alarm detailed view pop-up window 56 may be displayed. The detailed view trigger according to the example shown in FIG. 12 is a user input of touching the detailed view icon 55, but various other user inputs may be included as the detailed view trigger. That is, any user input may be included as the detailed view trigger of the present disclosure as long as the user input is a user input that pops up a detailed view window for viewing an announcement in detail.

In other embodiments related to operation S130, a chat room corresponding to at least one announcement included in the announcement list may be displayed in response to a chat room connection trigger. According to this embodiment, it is possible to enhance user convenience by displaying a chat room corresponding to the announcement specified by the user. For example, when a chat room icon for the announcement is touched, the chat room may be displayed. However, the scope of the present disclosure is not limited thereto, and any user input may be included as the chat room connection trigger of the present disclosure as long as the user input is a user input for displaying the chat room corresponding to the announcement.

So far, various embodiments related to the announcement list display operation performed on the intro screen have been described with reference to FIG. 2 and related exemplary drawings. Various embodiments related to the creation of announcements will be described below with reference to FIG. 3.

Figure 3:
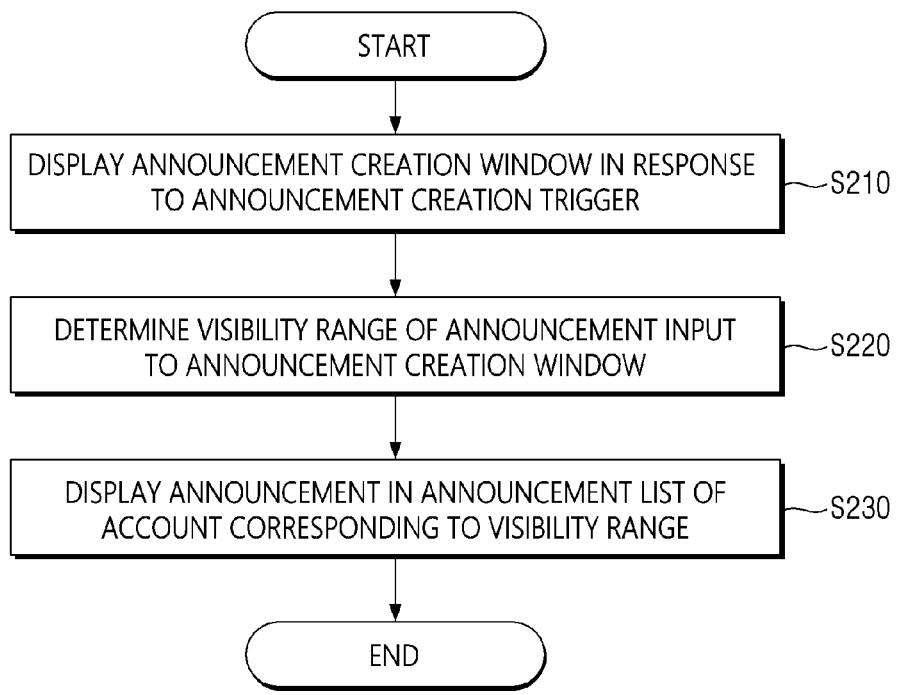
FIG. 3 is an exemplary flowchart illustrating an announcement display method according to other embodiments of the present disclosure.

Referring to FIG. 3, in operation S210, an announcement creation window may be displayed in response to an announcement creation trigger. Here, the announcement creation trigger may be a user manipulation performed on the intro screen. According to this embodiment, it is possible to enhance user convenience by allowing a user to easily create an announcement on the intro screen without entering the chat room.

Figure 8:
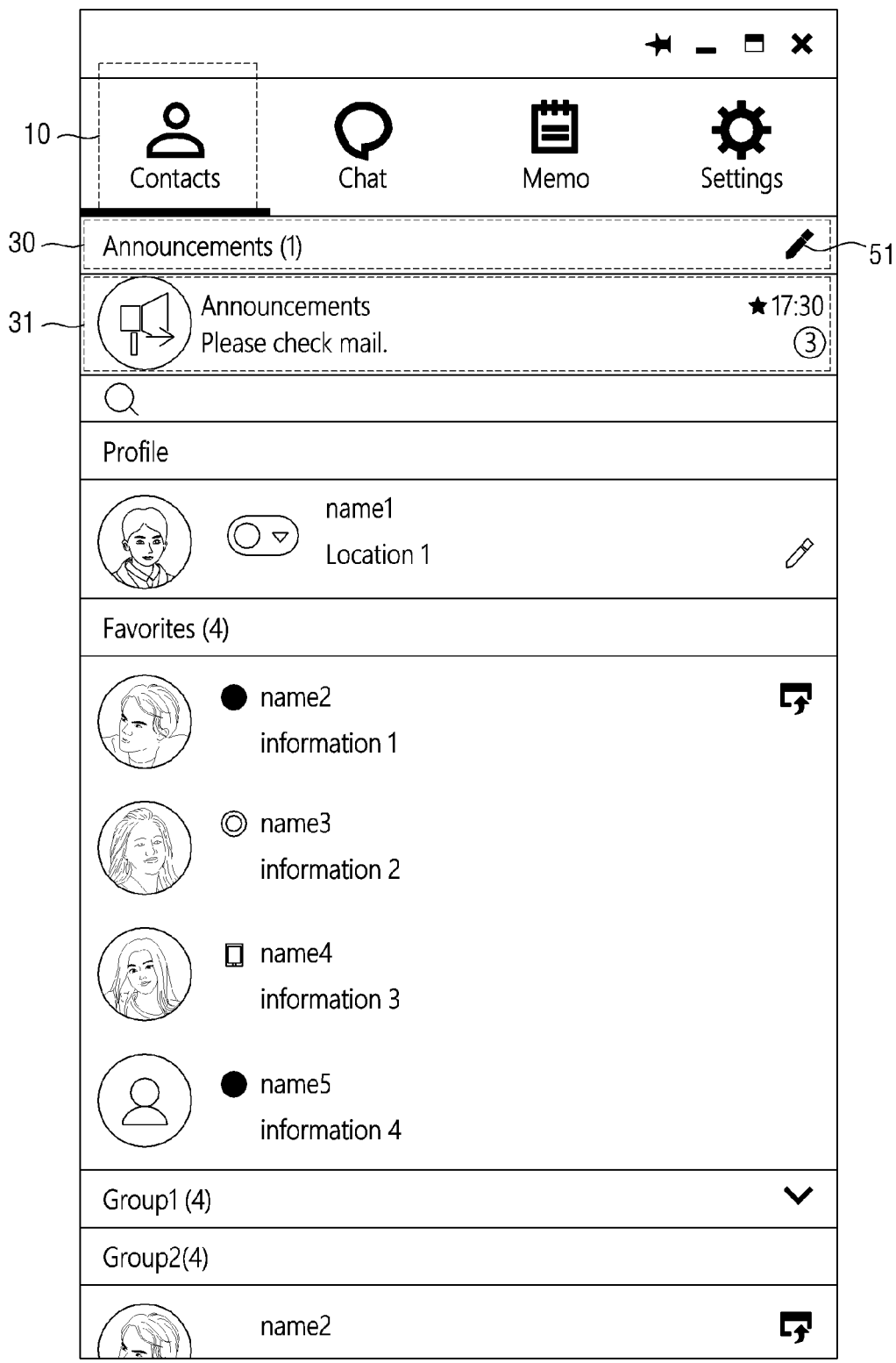
FIGS. 8 and 9 are example diagrams illustrating an operation of creating an announcement, to be referenced in some embodiments of the present disclosure.
Figure 9:
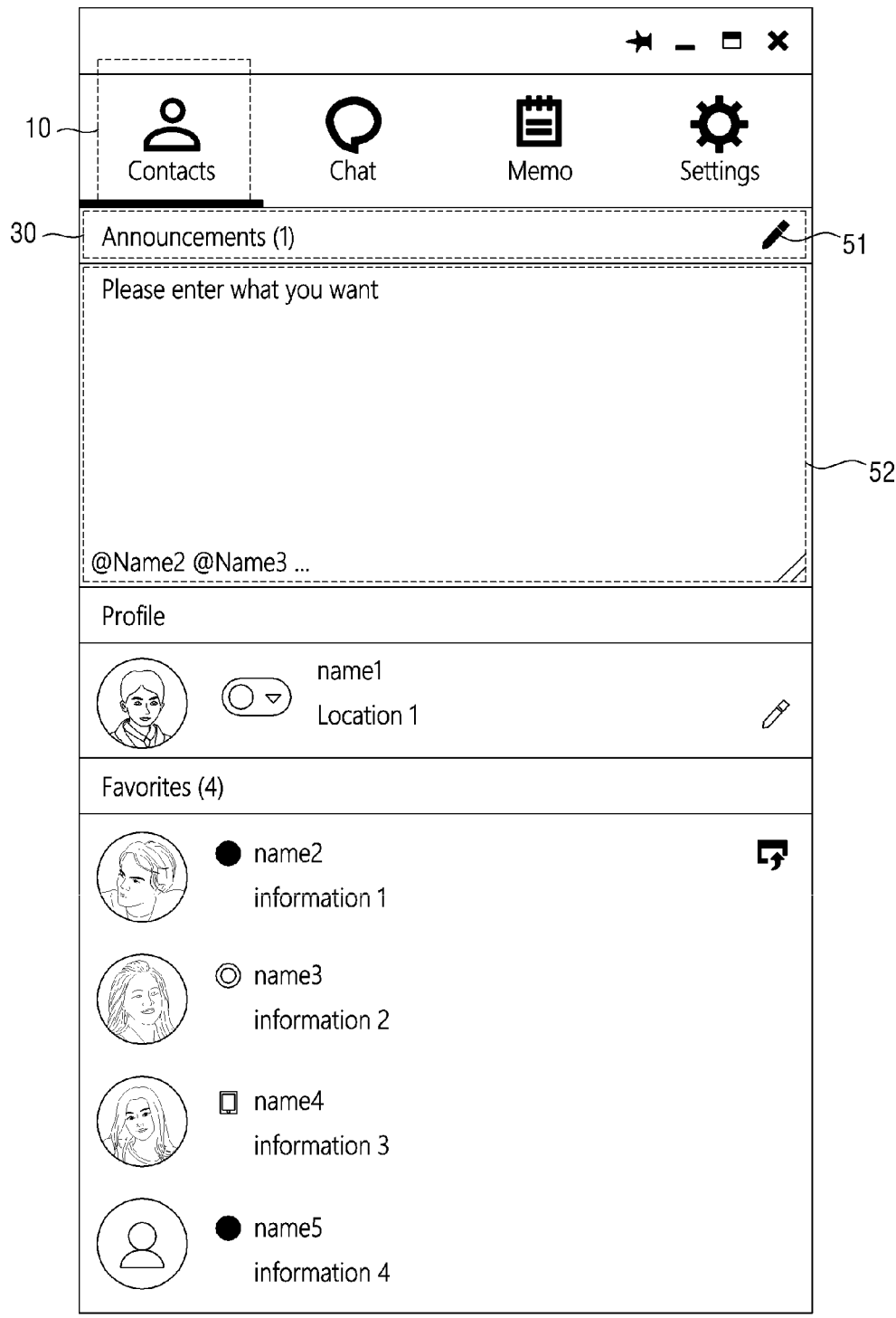

This will be described in detail below with reference to FIGS. 8 and 9. FIG. 8 shows an example in which an announcement creating icon 51 is shown in the announcement list 30. Here, when the announcement creating icon 51 is touched by the user, an announcement creation window 52 may be displayed as shown in FIG. 9. In FIGS. 8 and 9, an announcement creation window is displayed in response to a touch input of the user on the announcement creating icon 51 as an example of the announcement creation trigger, but various other user inputs may be included as the announcement creation trigger. That is, it should be noted that any input may be included as the announcement creation trigger as long as the input is a user input for displaying the announcement creation window.

Next, in operation S220, the visibility range of an announcement input to the announcement creation window may be determined.

In some embodiments related to operation S220, the visibility range may be specified by a creator account of the announcement. In this case, the visibility range may be specified in response to a drag input for at least one friend account included in a friend account list of the intro screen of the creator account of the announcement, and also the visibility range may be specified based on a friend account input to a visibility range configuration window. When this embodiment is described with a more specific example, a friend account may be dragged to the announcement creation window 52 shown in FIG. 9 and may also be directly input. At this time, it can be understood that the visibility range configuration window is included in the announcement creation window 52. Also, the visibility range may be specified to include all accounts included in a group included in the friend account list in response to a drag input for the group. According to the above-described embodiments, by determining a user-intended visibility range for an announcement, it is possible to effectively provide the announcement to those who are required to read the announcement.

In other embodiments related to operation S220, in the case of the visibility range, accounts predetermined by the user may be automatically determined. In other embodiments, in the case of the visibility range, some accounts may be automatically determined depending on the frequency of chats with the user account. In other embodiments, in the case of the visibility range, accounts related to the content of the announcement may be determined based on the content of the announcement created by the creator account of the announcement. In addition, it should be noted that various methods for determining the visibility range may be applied to the present disclosure. According to this embodiment, it is possible to enhance user convenience by automatically determining the visibility range even without the user separately specifying the visibility range.

The following description refers back to FIG. 3.

In operation S230, an announcement may be displayed in an announcement list of an account corresponding to the visibility range. Here, the announcement list may be fixedly displayed at the top of the intro screen of the account corresponding to the visibility range.

In some embodiments related to operation S230, the announcement may be displayed in an announcement viewer account only during a period specified by the announcement creator account. According to this embodiment, the viewing period for the announcement may be limited.

So far, various embodiments related to the announcement creation operation performed on the intro screen have been described with reference to FIG. 3 and related exemplary drawings. Various embodiments related to the announcement display operation performed on the chat screen will be described below with reference to FIG. 4.

Figure 4:
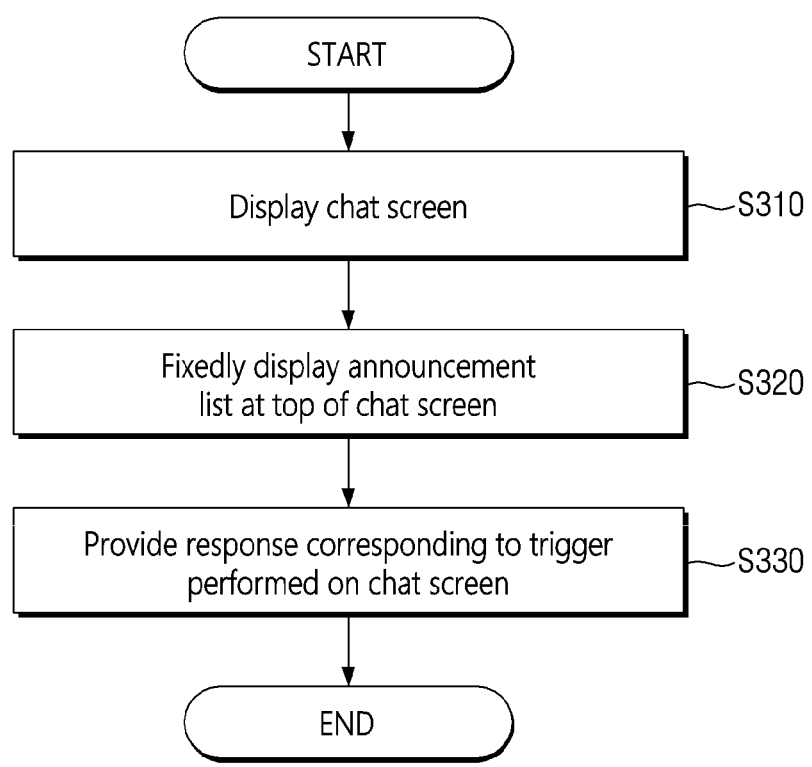
FIG. 4 is an exemplary flowchart illustrating an announcement display method according to other embodiments of the present disclosure.

Referring to FIG. 4, in operation S310, a chat screen may be displayed. This will be described in detail below with reference to FIG. 16.

Figure 16:
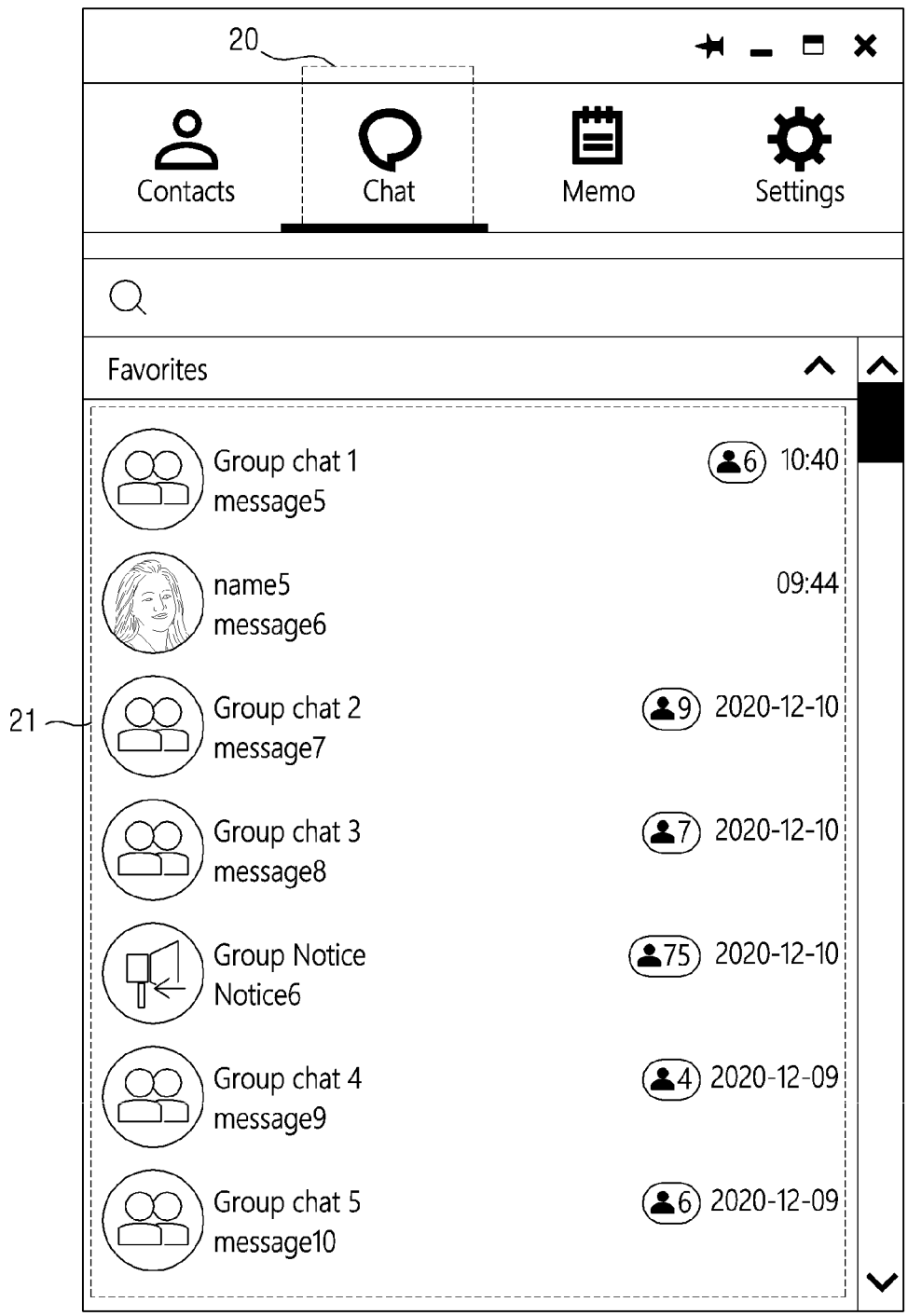
FIG. 16 is an example diagram of a chat screen of an instant messaging service, to be referenced in some embodiments of the present disclosure.

The instant messaging service may include various screens. Also, a plurality of buttons may be provided so as to change a screen that the instant messaging service provides, and FIG. 16 shows an example in which a chat button 20 is touched by a user. Here, a screen displayed when a contacts button 20 is touched may be referred to as a chat screen.

Referring to FIG. 16, the chat screen may include a plurality of chat rooms 21 to which the user account belongs. In some embodiments related to the chat screen, a chat room of a group to which the user account belongs may be included in the chat screen. In other embodiments, a chat room of a user account and a friend account may be included in the chat screen. In addition to those shown in FIG. 16, all known elements that may be included in the contacts screen may be applied to the present disclosure.

Figure 18:
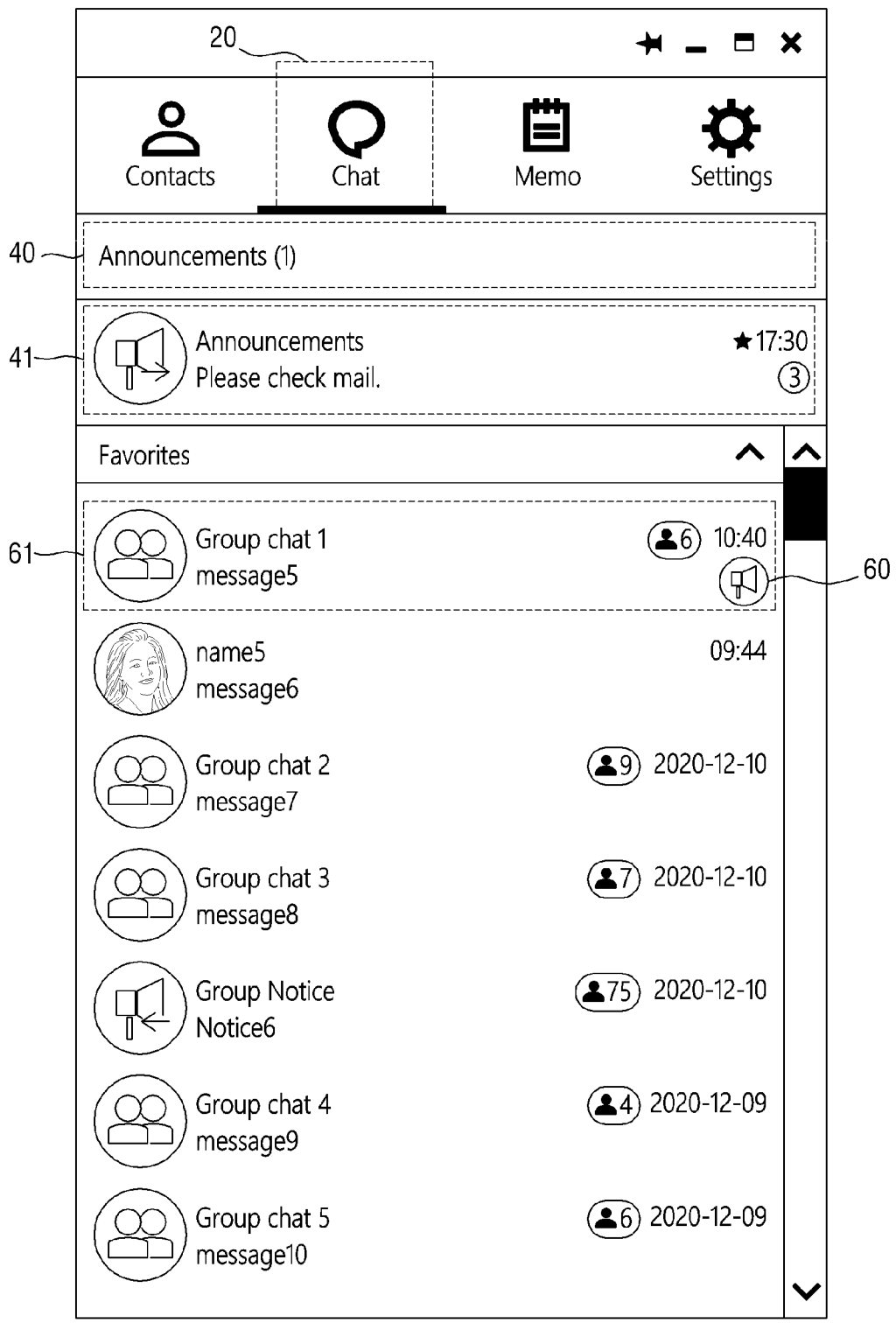
FIG. 18 is an example diagram of a chat screen in which an announcement icon is displayed, to be referenced in some embodiments of the present disclosure.

In some embodiments related to operation S310, an announcement icon may be displayed in a chat room corresponding to an announcement included in an announcement list which will be described below. Referring to FIG. 18, it can be seen that an announcement icon 60 is displayed in a chat room 61 corresponding to an announcement 41 included in an announcement list 40. According to this embodiment, the user can easily enter the chat room related to the announcement by intuitively recognizing the chat room corresponding to the announcement. Here, the announcement icon 60 may be displayed differently for each corresponding chat room, and according to this embodiment, the user can more intuitively recognize the correspondence between the announcement and the chat room.

In other embodiments related to operation S310, the chat room displayed on the chat screen may be changed in response to a chat room search trigger. For example, the scroll of the chat screen may be moved in response to a user's vertical drag input, and a chat room displayed in the chat screen may be changed as the scroll is moved. In addition, various types of user inputs may be included as the chat room search trigger of the present disclosure. Any input may be included as the chat room search trigger as long as the input is a user input for searching for a chat room in which the user account has participated.

The following description refers back to FIG. 4.

Next, in operation S320, an announcement list may be fixedly displayed at the top of the chat screen. This will be described in detail below with reference to FIG. 17.

Figure 17:
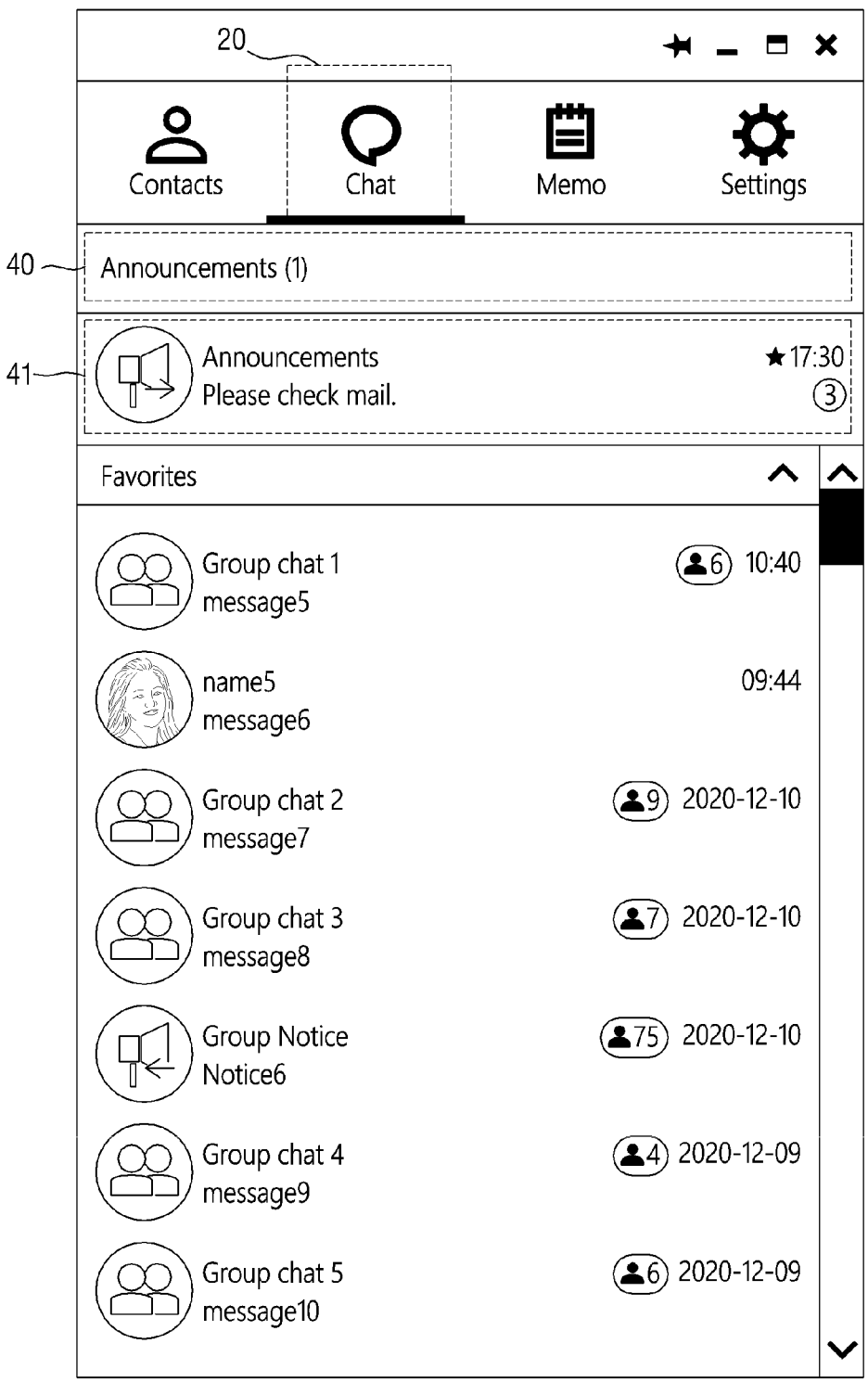
FIG. 17 is an example diagram of a chat screen in which an announcement list is displayed, to be referenced in some embodiments of the present disclosure.

Referring to FIG. 17, it can be seen that an announcement list 40 fixed at the top of the chat screen is shown. Also, an announcement 41 included in the announcement list 40 may be checked. Here, the announcement may be an announcement of one of a plurality of chat rooms to which the user account belongs. Although FIG. 17 shows that one announcement is included in the announcement list 40, the number of announcements that may be included in the announcement list 40 may vary, and this may be understood with reference to FIG. 7. Usually, a user participates in multiple chat rooms. Thus, according to the conventional art, a user's effort to find a specific chat room corresponding to a specific announcement among the multiple chat rooms in which the user participates is required in order to check the specific announcement. On the other hand, according to the embodiment described with reference to FIG. 17, the user can directly check the announcement on the chat screen without having to enter a chat room in which the announcement is registered. Thus, it is possible to enhance user convenience.

In some embodiments related to operation S320, only an announcement corresponding to a changed chat room displayed on the chat screen may be displayed in an announcement list in response to the above-described chat room search trigger. According to this embodiment, by displaying, in the announcement list, an announcement that is displayed on the chat screen and that corresponds to the chat room, a user can more intuitively recognize the correspondence between the announcement and the chat room.

Next, in operation S330, a response corresponding to the trigger performed on the chat screen may be provided. A relevant description is the same as that of operation S130 shown in FIG. 2 except that the screen on which the trigger is performed is different, and thus will be understood by referring to the description related to operation S130.

So far, embodiments related to the announcement display operation performed on the chat screen have been described with reference to FIG. 4 and related exemplary drawings. The announcement creation operation performed on the chat room may be understood with reference to FIG. 3 and related exemplary drawings, and thus a detailed description thereof will be omitted.

With the method of displaying announcements according to some embodiments of the present disclosure which has been described with reference to FIGS. 2 to 18 so far, it is possible to enhance user convenience by allowing announcements to be checked even when a user does not enter a chat room. The inconvenience of the conventional technology of having to enter a specific chat room in order to check an announcement can be eliminated. In addition, the utilization of an instant messaging service may be further increased by allowing a user to intuitively recognize an important announcement.

Figure 19:
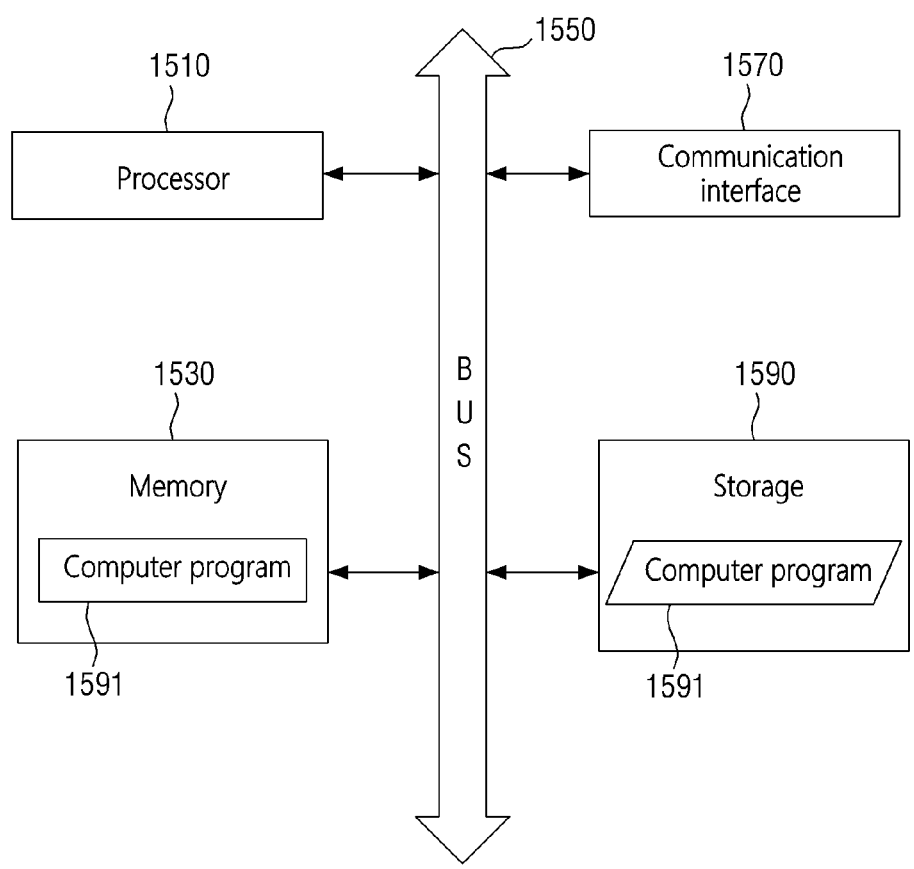
FIG. 19 shows an exemplary computing apparatus in which an apparatus and/or system according to various embodiments of the present disclosure may be implemented.

An exemplary computing device 1500 capable of implementing an installment payment device according to some embodiments of the present disclosure will be described in more detail below with reference to FIG. 19.

The computing device 1500 may include one or more processors 1510, a bus 1550, a communication interface 1570, a memory 1530, which loads a computer program 1591 executed by the processors 1510, and a storage 1590 for storing the computer program 1591. However, FIG. 19 illustrates only the components related to the embodiment of the present disclosure. Therefore, it will be appreciated by those skilled in the art that the present disclosure may further include other general purpose components in addition to the components shown in FIG. 19.

The processor 1510 controls overall operations of each component of computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 stores various data, instructions and/or information. The memory 1530 may load one or more programs 1591 from the storage 1590 to execute methods/operations according to various embodiments of the present disclosure. An example of the memory 530 may be a RAM, but is not limited thereto.

The bus 1550 provides communication between components of computing device 1500. The bus 1550 may be implemented as various types of bus such as an address bus, a data bus and a control bus.

The communication interface 1570 supports wired and wireless internet communication of the computing device 1500. The communication interface 1570 may support various communication methods other than internet communication. To this end, the communication interface 1570 may be configured to include a communication module well known in the art of the present disclosure.

The storage 1590 can non-temporarily store one or more computer programs 1591. The storage 1590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure are implemented. When the computer program 1591 is loaded on the memory 1530, the processor 1510 may perform the methods/operations in accordance with various embodiments of the present disclosure by executing the one or more instructions.

In the case, the announcement display device according to some embodiments of the present disclosure may be implemented through the computing device 1500.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as interne and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. An announcement display method performed by a computing device for an instant messaging service, the announcement display method comprising:
  displaying an intro screen including a friend account list of a user account, the intro screen being different from a screen displaying messages of a chat room;
  fixedly displaying an announcement list at a top of the intro screen separately from the friend account list, wherein the announcement list comprises at least one announcement of at least one chat room to which the user account belongs;
  displaying a comment icon in an announcement displayed at the top of the intro screen while displaying the friend account list in the intro screen; and
  in response to user input on the comment icon, displaying a comment related to the announcement while displaying the friend account list in the intro screen.

2. The announcement display method of claim 1, wherein the displaying of the comment comprises:
  determining, as a visibility range, at least one participant account of the chat room; and
  displaying the comment in association with the announcement included in the announcement list of the at least one participant account within the visibility range.

3. The announcement display method of claim 1, wherein the displaying of the announcement list further comprises deleting at least one announcement included in the announcement list in response to an announcement deletion trigger.

4. The announcement display method of claim 1, wherein the announcement list comprises a plurality of announcements; and
  the displaying of the announcement list comprises sorting and displaying the plurality of announcements in order of importance.

5. The announcement display method of claim 4, wherein the importance is determined based on a score assigned by a creator account of each of the plurality of announcements.

6. The announcement display method of claim 4, wherein the importance is determined based on a result of searching each of the plurality of announcements for a predetermined keyword.

7. The announcement display method of claim 1, wherein the announcement list comprises a plurality of announcements; and the displaying of the announcement list comprises sorting and displaying the plurality of announcements included in the announcement list in an order corresponding to a rule designated by a user in response to a sort trigger.

8. The announcement display method of claim 1, further comprising providing an alarm for the at least one announcement at a time specified by a user in response to an announcement notification trigger.

9. The announcement display method of claim 1, further comprising transmitting the at least one announcement to a mail address associated with the user account in response to a mail transmission trigger.

10. The announcement display method of claim 1, further comprising displaying a pop-up window for the at least one announcement to show a detailed view in response to a detailed view trigger.

11. The announcement display method of claim 1, further comprising displaying a chat room from which the at least one announcement included in the announcement list comes in response to a chat room connection trigger.

12. An announcement display method performed by a computing device for an instant messaging service, the announcement display method comprising:
- displaying an announcement creation window in response to an announcement creation trigger, the announcement creation trigger being a user manipulation performed in an intro screen including a friend account list of a user account, the intro screen being different from a screen displaying messages of a chat room;
- determining at least one account of the friend account list as a visibility range of an announcement input to the announcement creation window; and
- displaying the announcement in an announcement list of the at least one account determined as the visibility range,
- wherein the announcement list is fixedly displayed at a top of the intro screen of the at least one account determined as the visibility range and is separately displayed from the friend account list;
- wherein the determining the at least one account of the friend account list as the visibility range comprises,
- in response to a friend account being dragged into the announcement creation window while displaying the friend account list in the intro screen, determining the friend account as the visibility range of the announcement.

13. The announcement display method of claim 12, wherein the determining of the at least one account of the friend account list as the visibility range comprises determining the visibility range in response to a drag input for a group included in the friend account list.

14. The announcement display method of claim 12, wherein the determining of the at least one account of the friend account list as the visibility range comprises:
- displaying a visibility range configuration window in response to a visibility range configuration trigger; and
- determining the at least one account of the friend account list as the visibility range on the basis of a friend account input to the visibility range configuration window.

15. The announcement display method of claim 12, wherein the displaying of the announcement comprises displaying the announcement during only a period specified by a user.

16. An announcement display method performed by a computing device for an instant messaging service, the announcement display method comprising:
- displaying a chat screen including at least one chat room to which a user account belongs;
- fixedly displaying an announcement list at a top of the chat screen and displaying the at least one chat room at a bottom of the announcement list, wherein the announcement list comprises at least one announcement of at least one chat room to which the user account belongs; and
- displaying an announcement icon in a chat room corresponding to an announcement displayed at the top of the chat screen while displaying the at least one chat room at the bottom of the announcement list in the chat screen,
- wherein the announcement, displayed at the top of the chat screen, includes a first icon, and
- wherein the announcement icon, displayed in the chat room corresponding to the announcement, is same as the first icon.

17. The announcement display method of claim 16, wherein the displaying of the chat screen comprises changing and displaying a chat room included in the chat screen in response to a chat room search trigger; and
- the displaying of the announcement list comprises displaying only an announcement corresponding to the displayed chat room in response to the chat room search trigger.

\* \* \* \* \*